United States Patent
Jadhav et al.

(10) Patent No.: US 12,032,957 B2
(45) Date of Patent: Jul. 9, 2024

(54) SYSTEMS AND METHODS FOR PROVIDING SOFTWARE DEVELOPMENT PERFORMANCE PREDICTIONS

(71) Applicant: Capital One Services, LLC, McLean, VA (US)

(72) Inventors: Shweta Jadhav, Fairfax, VA (US);
Alexa Choi, Reston, VA (US);
Angelina Huynh, Reston, VA (US);
Rachel Johnston, McDaniel, MD (US);
Rui Zhang, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/545,014

(22) Filed: Dec. 8, 2021

(65) Prior Publication Data
US 2023/0176862 A1 Jun. 8, 2023

(51) Int. Cl.
*G06F 8/77* (2018.01)
*G06F 8/10* (2018.01)

(52) U.S. Cl.
CPC . *G06F 8/77* (2013.01); *G06F 8/10* (2013.01)

(58) Field of Classification Search
None
See application file for complete search history.

(56) References Cited

U.S. PATENT DOCUMENTS

| | | | | |
|---|---|---|---|---|
| 8,448,127 B2 * | 5/2013 | Lindley | ............ | G06Q 10/06 |
| | | | | 717/102 |
| 8,660,874 B2 * | 2/2014 | Allam | ............ | G06Q 10/063 |
| | | | | 705/7.12 |
| 8,875,088 B1 * | 10/2014 | Holler | ............ | G06Q 10/0631 |
| | | | | 717/101 |

(Continued)

OTHER PUBLICATIONS

Y. Mahmood, N. Kama, A. Azmi and M. Ali, "Improving Estimation Accuracy Prediction of Software Development Effort: A Proposed Ensemble Model," 2020 International Conference on Electrical, Communication, and Computer Engineering (ICECCE), Istanbul, Turkey, 2020, pp. 1-6. (Year: 2020).*

*Primary Examiner* — Andrew M. Lyons
(74) *Attorney, Agent, or Firm* — TROUTMAN PEPPER HAMILTON SANDERS LLP; Christopher J. Forstner; John A. Morrissett

(57) ABSTRACT

A system for providing software development performance predictions is disclosed. The system can include one or more processors and a memory in communication with the processors storing instructions that, when executed by the processors are configured to cause the system to perform method steps. The system can receive data associated with a plurality of completed projects and a request for a new software development project. The system can determine first metrics associated with each completed project and second metrics associated with the new software development project. The first and second metrics may be associated with one or more predictive variables. The system can define (Continued)

predictive model systems based on one or more predictive variables and identify completed projects including a first subgroup of first metrics that match the second metrics beyond a predetermined threshold. The system can determine a performance prediction based on the identified first subgroup of first metrics.

20 Claims, 5 Drawing Sheets

(56) References Cited

U.S. PATENT DOCUMENTS

| | | |
|---|---|---|
| 9,172,738 B1 | 10/2015 | Dacosta |
| 9,262,126 B2 | 2/2016 | Ghaisas |
| 9,501,751 B1 | 11/2016 | Holler et al. |
| 9,619,208 B2 | 4/2017 | Davidov et al. |
| 9,690,461 B2 | 6/2017 | Holler et al. |
| 9,990,193 B2 | 6/2018 | Hanusiak et al. |
| 10,001,975 B2 | 6/2018 | Bharthulwar |
| 10,332,073 B2* | 6/2019 | Abebe .................. G06Q 10/103 |
| 11,036,938 B2 | 6/2021 | Alexander et al. |
| 2003/0018952 A1* | 1/2003 | Roetzheim ............. G06Q 10/10 714/E11.22 |
| 2008/0313595 A1* | 12/2008 | Boulineau ........ G06Q 10/06313 717/101 |
| 2009/0138843 A1* | 5/2009 | Hinton ...................... G06F 8/74 717/101 |
| 2009/0228261 A1* | 9/2009 | Chulani .................. G06Q 10/04 703/22 |
| 2014/0282355 A1* | 9/2014 | Berry ........................ G06F 8/70 717/101 |
| 2015/0268953 A1* | 9/2015 | Koezuka ................... G06F 8/71 717/121 |
| 2016/0283878 A1* | 9/2016 | Nathanson ....... G06Q 10/06314 |
| 2017/0192778 A1* | 7/2017 | Srivastava ................ G06F 8/20 |
| 2018/0330249 A1* | 11/2018 | Hajiyev .................. G06N 5/04 |
| 2018/0349135 A1* | 12/2018 | Burns ....................... G06F 8/77 |
| 2019/0122153 A1* | 4/2019 | Meharwade ..... G06Q 10/06313 |
| 2019/0155577 A1* | 5/2019 | Prabha ............... G06Q 10/0635 |
| 2020/0183653 A1* | 6/2020 | Subbiah ................... G06F 8/77 |
| 2021/0157715 A1* | 5/2021 | Hand ............... G06Q 10/06313 |
| 2021/0256453 A1* | 8/2021 | Morgan ......... G06Q 10/063112 |
| 2022/0122025 A1* | 4/2022 | Amit ........................ G06F 8/77 |
| 2022/0334837 A1* | 10/2022 | Sa ............................ G06F 8/20 |
| 2022/0357929 A1* | 11/2022 | Vijayaraghavan ....... G06N 3/04 |

* cited by examiner

SYSTEMS AND METHODS FOR PROVIDING SOFTWARE DEVELOPMENT PERFORMANCE PREDICTIONS

FIELD OF THE INVENTION

The presently disclosed subject matter relates generally to software development, and more particularly to systems and methods for providing software development performance predictions.

BACKGROUND

Traditionally, businesses have used various retrospective metrics to determine performance of teams developing software. Many businesses have adopted the agile framework to focus on improving the effectiveness of software development. However, current agile practices rely on retrospective metrics that are based on past performance, which makes it difficult to predict future team performance for similar projects.

Accordingly, there is a need for improved software development performance prediction systems to accurately predict future software development team performance. Embodiments of the present disclosure are directed to this and other considerations.

SUMMARY

Disclosed embodiments provide systems and methods for providing software development performance predictions.

Consistent with the disclosed embodiments, various methods and systems are disclosed. In an embodiment, a system for providing software development performance predictions is disclosed. The system may include one or more processors and a memory in communication with the one or more processors and storing instructions that, when executed by the one or more processors, are configured to cause the system to perform a method consistent with the disclosed embodiments. The method may include receiving project data associated with a plurality of completed projects. Each of the plurality of completed projects can be associated with a respective pre-existing software development team of a plurality of pre-existing software development teams. The project data can include first metrics associated with one or more predictive variables. The method may include receiving a first request for a first new software development project which can be associated with a first software development team of the plurality of pre-exiting software development teams. The method may include determining one or more second metrics associated with the first new software development project. The one or more second metrics may be associated with the one or more predictive variables. The method may include defining one or more predictive model systems based at least in part on the one or more predictive variables. The method may include identifying a first portion of completed project based on the one or more predictive model systems. The first portion of completed projects can be associated with the first software development team and can include a first subgroup of the first metrics that match the second metrics beyond a first predetermined threshold. The method may include determining, based on the one or more predictive model systems, a first performance prediction for the new software development project based on the first subgroup of the first metrics.

In another aspect, a system performing a method of providing software development performance predictions is disclosed. The method may include aggregating completed project data of a plurality of completed projects each associated with a respective pre-existing software development team of a plurality of pre-existing software development teams. The completed project data can include first metrics associated with at least one predictive variable including team size, scheduled time off, work holidays, new tools, new processes, new engineering requirements, backlog health, code complexity, team member expertise, or combinations thereof. The method can include receiving a first request for a first new software development project. The first request can be associated with a first software development team of the plurality of pre-existing software development teams. The method can include determining one or more second metrics associated with the first new software development project. The one or more second metrics may be associated with at least one predictive variable. The method may include defining one or more predictive model systems based at least in part on the at least one predictive variable. The method may include, identifying a first portion of completed project based on the one or more predictive model systems. The first portion may be associated with the first software development team and may include a first subgroup of the first metrics that match the second metrics beyond a first predetermined threshold. The method may include, determining a first performance prediction for the first new software development project based on the first subgroup of the first metrics and as determined by the one or more predictive model systems. The method may include determining a first performance result of the first new software development project, comparing the first performance result to the first performance prediction, and updating the one or more predictive model systems based at least in part on the comparison.

In another aspect, a method of providing software development performance predictions is disclosed. The method may include receiving project data associated with a plurality of completed projects, each of the plurality of completed projects associated with a respective pre-existing software development team of a plurality of pre-existing software development teams. The project data can include first metrics associated with one or more predictive variables. The method can include receiving a first request for a first new software development project which may be associated with a new software development team. The method may include determining one or more second metrics associated with the first new software development project. The one or more second metrics can be associated with the one or more predictive variables. The method may include defining one or more predictive model systems based at least in part on the one or more predictive variables. The method may include identifying a first software development team of the plurality of pre-existing software development teams that include a first subgroup of the first metrics that match the second metrics beyond a first predetermined threshold. The identification can be based on the one or more predictive model systems. The method may include determining, based on the one or more predictive model systems, a first performance prediction for the first new software development project based on the first subgroup of the first metrics.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

The accompanying drawings, which are incorporated and constitute a part of this specification, illustrate various embodiments and aspects of the disclosed embodiments and, together with the description, serve to explain the principles of the disclosed embodiments. In the drawings.

DETAILED DESCRIPTION

Examples of the present disclosure generally include systems and methods for providing software development performance predictions. The systems and methods are also able to continuously update one or more predictive model systems with updated metrics that increase the accuracy of the performance predictions made by the system, which can decrease the costs and inefficiencies associated with over-committing or under committing resources to a respective software development project.

The system and methods described herein are necessarily rooted in computer technology as they relate to improving the functioning of software development framework, such as an agile framework. Prior software development frameworks rely on retrospective metrics to assess software development performance, which leads to either an overcommitment or under commitment of resources towards new software development projects. Instead, the present systems and methods facilitate predictive systems that allow for the appropriate level of resources to be dedicated to a respective software development project.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
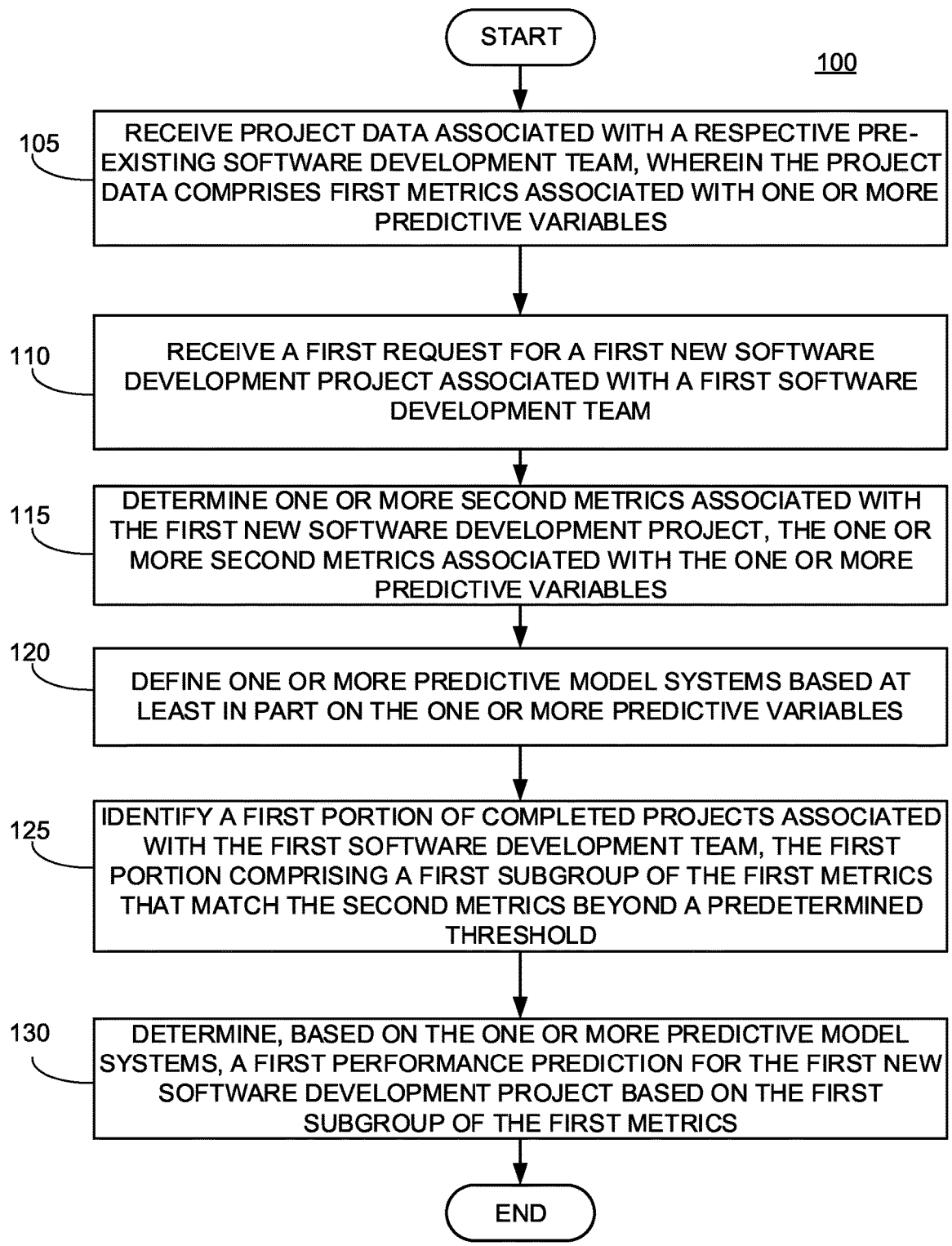
FIG. 1 is a flowchart of an exemplary method of providing software development performance predictions, according to an example embodiment.

FIG. 1 is a flowchart of an exemplary method of providing software development performance predictions, according to an example embodiment. In block 105, the system (e.g., performance prediction device 410, as described in more detail with respect to FIGS. 4-5), may receive project data. The project data may be associated with one of a plurality of pre-existing software development teams. The project data can include metrics associated with respective projects. Each metric can be associated with one or more predictive variables.

For example, the one or more predictive variables can include variables selected from a team size, scheduled time off associated with each team member of a respective team, and scheduled work holidays. The one or more predictive variables can also include new tools that are required to complete a respective software development project, new processes that are required to complete a respective software development project, new engineering requirements associated with a respective software development project, backlog health associated with a respective software development project, code complexity associated with a respective software development project, and team member expertise.

Each metric included within the project data can include a value associated with at least one of the one or more predictive variables. For example, the predictive variable "team size" may include a metric that indicates the number of team members on any given software development team (e.g., a team size metric of 5 may indicate that a respective software development team has 5 members). A metric associated with scheduled time off can be provided as a number of days that each team member of a given software development team is scheduled to be off work during the completion of a given software development project. The scheduled time off metric can be provided on a per member basis, or it may be aggregated across each team member of a given software development team. Scheduled work holidays can be provided in a similar manner to a scheduled time of metric. Metrics associated with new tools can include a number component and a complexity component. For example, the metrics can include a number of new tools that must be implemented during the development cycle of a respective software development project, as well as including a complexity weighting factor for each of the number of new tools. In some embodiments, the new tools metric can be provided as a weighted sum of each new tool multiplied by its respective complexity factor. Metrics associated with new processes and new engineering requirements can be provided in a similar manner as the metrics associated with new tools. Backlog health can be understood as a number of tasks that a respective software development team has available to work on following completion of a respective software development project. Accordingly, a higher number of tasks associated with a backlog health matrix indicates that the respective software development team will have less downtime after completing their assigned tasks and/or can quickly switch to a different task if a remaining task of a respective software development project is blocked or temporarily impeded. Code complexity can be reported as a value on a predefined scale (e.g., 0 to 10) with a lower value indicative of less complex code necessary to complete a respective software development project, and a higher value indicative of more complex code. In some embodiments, code complexity can be based in part on the number of lines of code within the software development project. In some embodiments, code complexity can be measured based on a number of linearly independent paths through a respective program's source code. For example, according to some embodiments, code complexity can be represented by the cyclomatic complexity metric. The code complexity metric (e.g., cyclomatic complexity metric) can be based on, for example, the presence and number of conditional operators within the code and the number of lines of code. Team member expertise can be reported as a value on a predefined scale (e.g., 0 to 10) with a lower value indicative of a less experienced team member or team members and a higher value indicative of a more experienced team member or team members. Expertise can be quantified based on one or more factors selected from years of work experience, education level, and/or level of seniority within a respective software development organization. According to some embodiments, a team that is composed of highly experienced people may not require the same amount of team members as a team that is composed of less experienced team members. For example, the system may determine that a team of 4 people that have 10 or more years of experience at an organization can perform a similar software development project as a team of 5 people that have less than one year of experience in the organization.

In block 110, the system (e.g., performance prediction device 410) can receive a first request for a first new software development project associated with a first software development team. The first software development team may be one of the plurality of pre-existing software development teams. However, in some embodiments, the new software development project can be associated with a new software development team that has not previously submitted completed project data to the system.

In block 115, the system (e.g., performance prediction device 410) can determine one or more second metrics associated with the first new software development project. Each of the one or more second metrics can be associated with a respective predictive variable of the one or more predictive variables. For example, the one or more second metrics can be associated with the one or more predictive variables previously described, such as team size, scheduled time off, work holidays, new tools, new processes, new engineering requirements, backlog health, code complexity, and team member expertise. For example, the system may receive metrics indicating the team size of the first new software development project includes 5 members. The system may receive a metric of 3 for work holidays, indicating that there are 3 scheduled work holidays during a time period associated with the anticipated completion of the first new software development project. Similarly, the system may analyze the project requirements to determine whether the first new software development project includes any new tools, new processes, and/or new engineering requirements, and may determine a metric for each predictive variable. As more information is added to the first new software development project, the metrics may be continuously or intermittently updated as more information becomes available to the system. For example, a performance prediction device (e.g., performance prediction device 410) may intermittently (e.g., once a day, once a week, etc.) query a software development management device (e.g., software development management device 420) and/or a project repository (e.g., project repository 430) for new information related to the first new software development project.

In block 120, the system (e.g., performance prediction device 410) can define one or more predictive model systems based at least in part on the one or more predictive variables. For example, the performance prediction device may include one or more predictive model systems, such as a team capacity predictive model and a team velocity predictive model. Each of the one or more predictive model systems may be determined based at least in part on the received project data and one or more predictive model variables. Each of the predictive model systems may be based off distinct predictive model variables. For example, the team capacity predictive model may indicate a number of team members that a respective software development team is suggested to have. The team capacity model may be based at least in part on received project data and predictive model variables such as team size, scheduled time off, work holidays, and team member expertise. The team velocity predictive model may be based at least in part on the received project data and predictive model variables such as new tools, new processes, new engineering requirements, backlog health, and code complexity. The system may use the one or more predictive model systems to generate a performance prediction for a software development team working on a new software development project based on project data associated with completed software development projects, the one or more predictive model systems, and the one or more predictive variables.

According to some embodiments, the one or more predictive model systems may include a trained machine learning algorithm that is configured to receive project data (including metrics) and predictive variables associated with each completed project of the plurality of projects, and generate a vectorized representation of each completed project of the plurality of projects. For example, the one or more predictive model systems may generate a vectorized representation of each completed project, and may determine one or more similar new projects based on calculating a vector similarity between each vectorized representation of a completed project and a respective vectorized representation of a new software development project. According to some embodiments, the system (e.g., performance prediction device 410) may calculate the vector similarity using a cosine similarity between the two vectors.

In block 125, the system (e.g., performance prediction device 410) may identify a first portion of completed projects associated with the first software development team that include a first subgroup of first metrics that match the second metrics beyond a predetermined threshold. For example, the system may employ the one or more predictive model systems to determine a first portion of completed projects that include a first subgroup of first metrics that closely match the second metrics associated with the new software development project. According to some embodiments, the one or more predictive model systems may generate a vectorized representation of each completed project and a vectorized representation of the new software development project, and perform a vector similarity calculation between each completed project and the new software development project. One or more completed projects having a similarity beyond the predetermined threshold may be selected based on the performed vector similarity calculation. According to some embodiments, the most similar completed project may be selected, while in other embodiments, the top 2, 3, . . . , N−1, or N completed projects that have a similarity beyond the predetermined threshold may be selected.

In block 130, the system (e.g., performance prediction device 410) may determine, based on the one or more predictive model systems, a first performance prediction for the first new software development project based on the first subgroup of the first metrics. For example, if the system identifies completed project A having metrics similar to those associated with the new software development project, the system may determine a performance prediction based on the actual performance data associated with completed project A. If the system identifies completed projects A, B, and C as closely matching the new software development project, the system may determine a performance prediction that is a weighted average of the actual performance data associated with completed projects A, B, and C. In some embodiments, the system may give more weight to one of the completed projects than others. In some embodiments, the system may give more weight to one of the one or more predictive model variables than to others, and in other embodiments the system may give more weight to one of the predictive model systems than to others when determining a performance prediction for the new software development project.

According to some embodiments, the one or more predictive model systems (e.g., the team capacity predictive model and the team velocity predictive model) may each generate a performance prediction based on a comparison of metrics for the identified similar completed projects and the new software development project. The ultimate performance prediction may be based on a weighted average of the performance predictions generated by each of the one or more predictive model systems.

According to some embodiments, if the metrics for an identified similar completed project (e.g., completed project A) are found to be within the predetermined threshold to the new software development project, the performance prediction may be adjusted based on variances within the metrics associated with completed project A and the metrics of the completed software development project. For example, if both projects have similar metrics for the team capacity (e.g., the metrics indicate the same team size and similar amounts of days off) but there is a difference in one or more metrics associated with team velocity, the one or more predictive model systems may generate performance prediction that uses the actual performance of the completed project as a baseline but changes the performance prediction based on the variance in the team velocity metrics. For example, the new software development project may include an increased code complexity metric when compared to the code complexity metric for the similar completed project. Accordingly, the one or more predictive model systems (e.g., the team velocity predictive model) may generate a performance prediction lower than the actual performance associated with the similar completed project.

In another example, each previous software development project may be ranked based on a similarity of metrics to the new software development project, and the highest ranked software development project may be selected regardless of whether the software development project metrics meet a predetermined threshold.

According to some embodiments, each of the completed projects may be a completed agile sprint. For example, each completed project may be a project that is implemented in the agile framework. An agile sprint can be understood as a short, timed period during which a software development team works to complete a set amount of work that results in a completed project at the end of the timed period. According to some embodiments, the performance prediction generated by the system can be a sprint commitment reliability metric. A sprint commitment reliability metric can be understood as a ratio between the number of tasks a respective software development team completes at the end of the software development project versus the number of tasks the software development team committed to completing as part of the software development project. A sprint commitment reliability metric indicates a software development team that is performing better, because more tasks that have been committed to are actually completed. According to some embodiments, it is possible for the sprint commitment reliability metric to be greater than 1 (e.g., greater than 100%), when the software development team completes more tasks than the team had committed to completing as part of the software development project.

Figure 2:
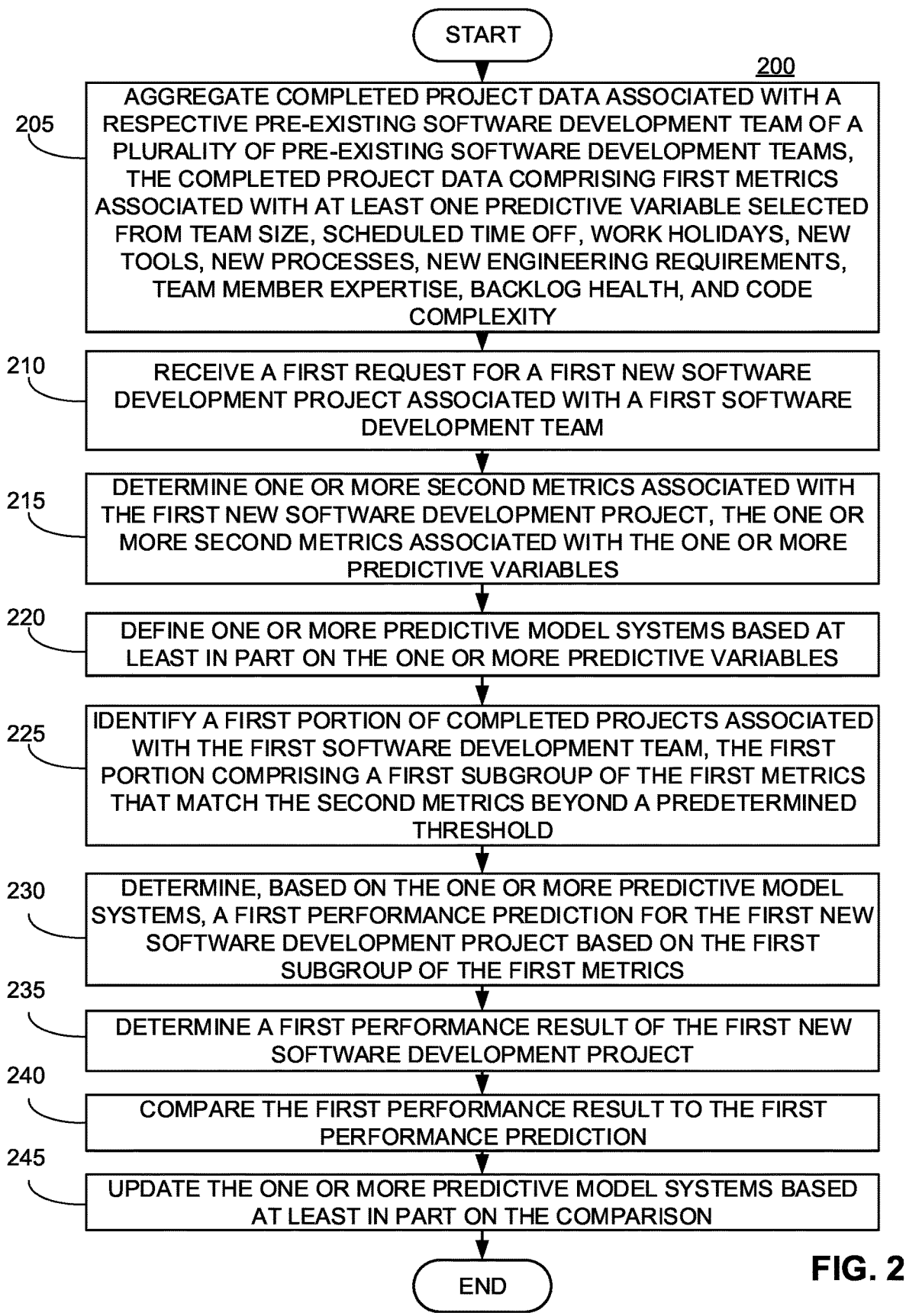
FIG. 2 is a flowchart of an exemplary method of providing software development performance predictions, according to an example embodiment.

FIG. 2 is a flowchart of an exemplary method of providing software development performance predictions, according to an example embodiment. Certain blocks of method 200 are substantially similar to those of method 100. For example, blocks 210, 215, 220, 225, and 230 are substantially similar to blocks 110, 115, 120, 125, and 130 of method 100, and a full description of these blocks will be omitted for brevity.

In block 205, the system (e.g., performance prediction device 410) may aggregate completed project data that is associated with a plurality of completed projects. Each of the plurality of completed projects may be associated with a respective pre-existing software development team of a plurality of pre-existing software development teams. The completed project data may include first metrics related to at least one predictive variable. The at least one predictive variable an include one or more of team size, scheduled time off, work holidays, new tools, new processes, new engineering requirements, backlog health, code complexity, team member expertise, or combinations of any of the above.

In block 235, after determining a first performance prediction for the first new software development project, the system may determine a first performance result of the first new software development project. For example, after the new software development project is completed, the system (e.g., performance prediction device 410) may query a software development management device (e.g., software development management device 420) to receive the recorded statistics associated with the newly completed project.

In block 240, the system (e.g., performance prediction device 410) may compare the first performance result to the first performance prediction. According to some embodiments, comparing the first performance result to the first performance prediction can include adjusting the value of one or more metrics associated with the first new software development project. For example, if the number of days off scheduled for the first new software development project was 3, but during the course of the project there were 5 days off, the system may adjust the metrics based on the updated values.

In block 245, the system (e.g., performance prediction device 410) may update the one or more predictive model systems based at least in part on the comparison. For example, the comparison can be used to update the completed project data, and the completed project data may be used to redefine the one or more predictive model systems (e.g., adjusting one or more weights associated with the predictive variables used to define the one or more predictive model systems), thereby allowing the performance prediction device 410 to take into account progressive changes within the performance of a software development team.

Figure 3:
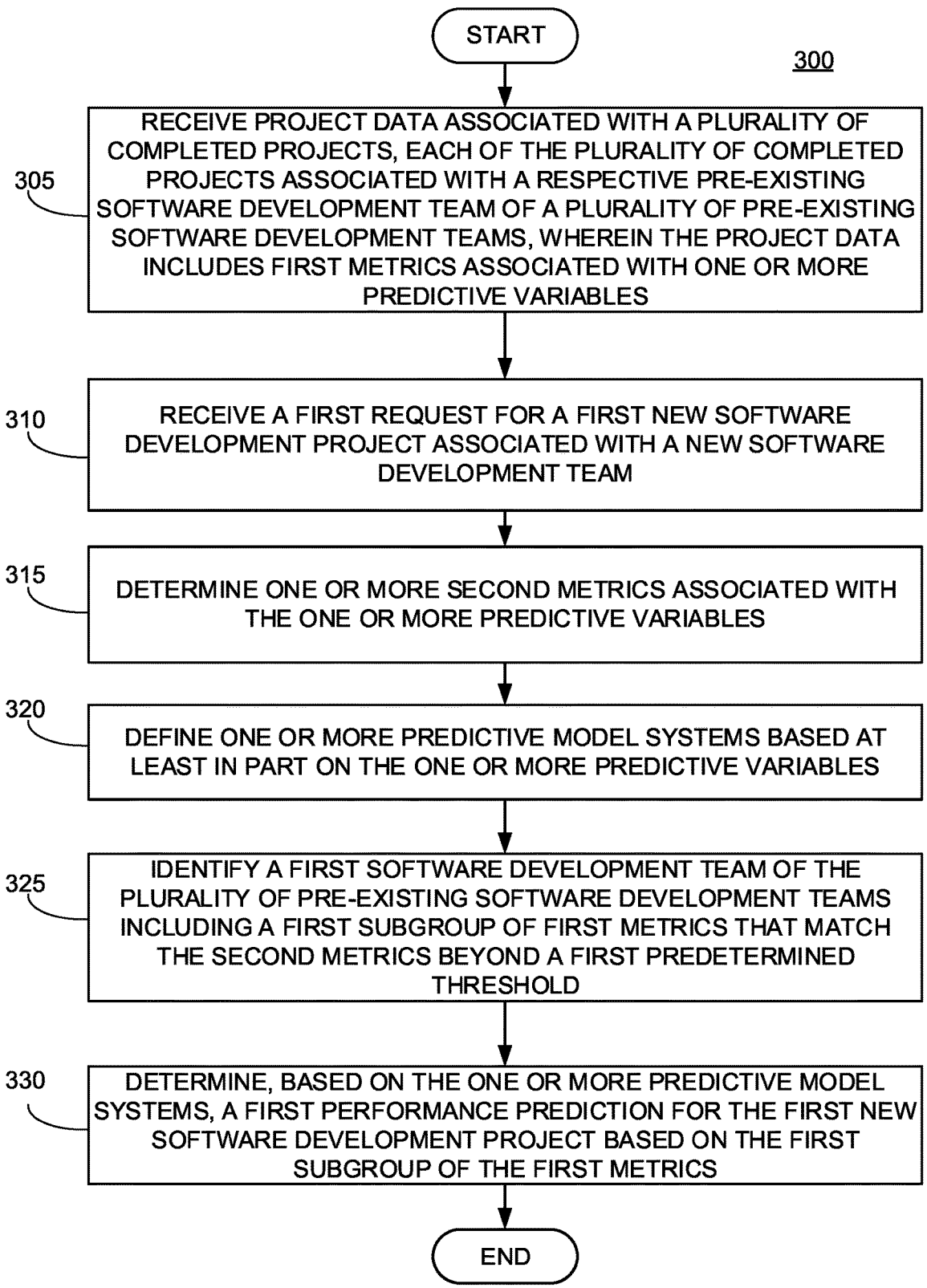
FIG. 3 is a flowchart of an exemplary method of providing software development performance predictions, according to an example embodiment.

FIG. 3 is a flowchart of an exemplary method of providing software development performance predictions, according to an example embodiment. Certain blocks of method 300 are substantially similar to those of method 100. For example, blocks 305, 315, 320, 325, and 330 are substantially similar to blocks 105, 115, 120, 125, and 130 of method 100, and a full description of these blocks will be omitted for brevity.

In block 310, the system (e.g., performance prediction device 410) may receive a first request for a first new software development project. The first new software development project may be associated with a new software development team. That is, the software development team may not have any completed projects as part of the completed project data received in block 305. Instead, the system may find one or more completed projects that are associated with a different software development team that nevertheless have similar metrics to the metrics associated with the first new software development project.

Figure 4:
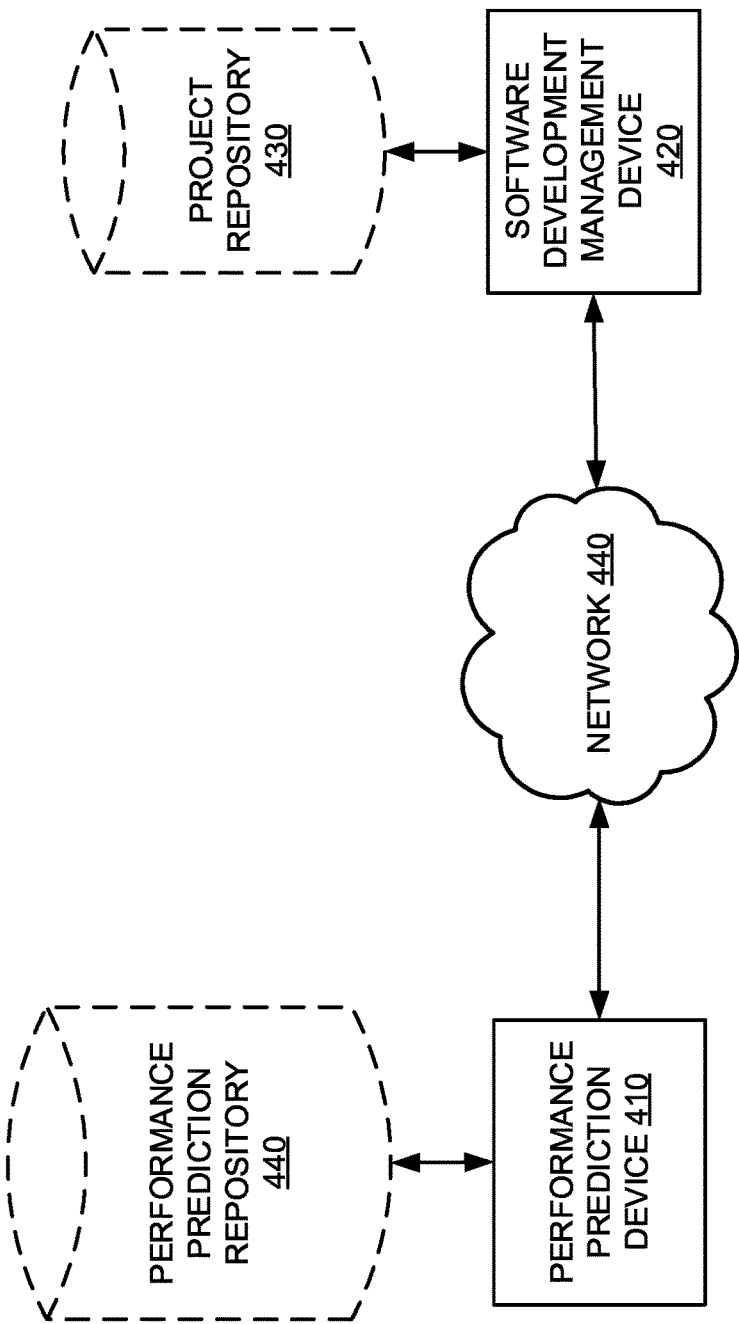
FIG. 4 illustrates an exemplary performance prediction system, according to an example embodiment.
Figure 5:
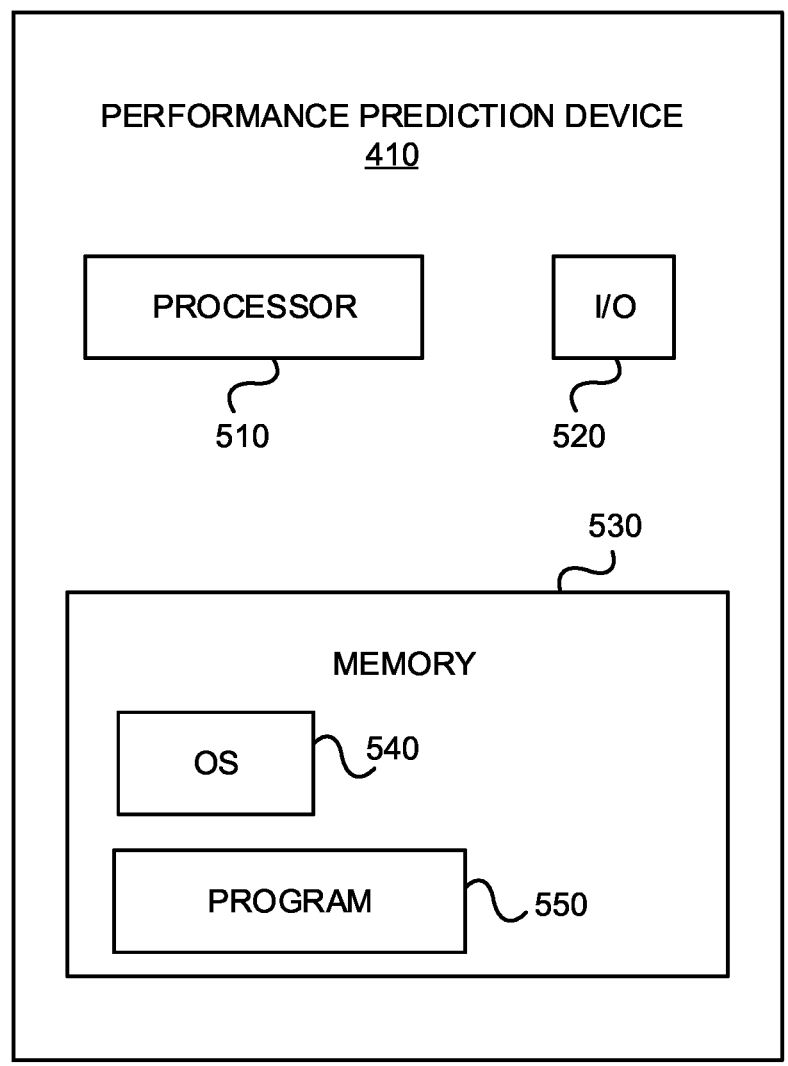
FIG. 5 is a component diagram of an exemplary performance prediction device, according to an example embodiment.

FIG. 4 illustrates an exemplary performance prediction system 400, according to an example embodiment. In one aspect, as shown, system 400 may include a performance prediction device 410, a software development management device 420, a project repository 430, performance prediction repository 440, and a network 450. In some embodiments, the performance prediction device 410 may operate in conjunction with the software development management device 420 to provide performance predictions for software development teams based on model data received from software development management device 420 and/or project repository 430.

In some embodiments, the performance prediction device 410 may host its own model data (e.g., using performance prediction repository 440). In some embodiments, the performance prediction device 410 may use the received completed project data to build one or more predictive model systems based on one or more predictive variables. The performance prediction device 410 may use the one or more predictive model systems to generate a performance prediction for a new software development project based on completed project data, the one or more predictive model systems, and the one or more predictive variables. After completion of the new project, the performance prediction device 410 can receive an indication of the actual performance associated with the completion of the new project, which may be used to update completed project data, and the completed project data may be used to redefine (e.g., revalue) the one or more predictive model systems.

The performance prediction device 410 may include one or more components that perform processes consistent with the disclosed embodiment. For example, the performance prediction device 410 may include one or more computers (e.g., servers, database systems, etc.) configured to execute software instructions programmed to perform aspects of the disclosed embodiments, such as processing information related to the completed project data metrics or new project data metrics.

In some embodiments, the performance prediction device 410 may include one or more predictive model systems, such as the team capacity predictive model system and/or the team velocity predictive model system. Each of the predictive model systems may be based off distinct predictive model variables. For example, the team velocity predictive model system can be based off one or more predictive variables such as new tools, new processes, new engineering requirements, backlog health, code complexity, and team member expertise. The team capacity predictive model can be based on one or more predictive variables such as team size, scheduled time off, and work holidays.

The performance prediction repository 440 may be associated with the performance prediction device 410, and in some embodiments, the performance prediction repository 440 may store completed project data including project metrics.

The software development management device 420 may represent a system associated with an enterprise that employed one or more software development teams responsible for completing software development projects. The software development management device 420 may include one or more components that perform processes consistent with the disclosed embodiments. For example, the software development management device 420 may include one or more computers (e.g., servers, database systems, etc.) that are configured to execute software instructions programmed to perform aspects of the disclosed embodiments.

The project repository 430 may be associated with the software development management device 420, and in some embodiments, the project repository 430 may store completed project data including project metrics.

Facilitating communication between components of the system 400, the network 450 may be of any suitable type, including individual connections via the Internet such as cellular or WiFi networks. In some embodiments, the network 450 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Components of the performance prediction device 410 are shown in more detail in FIG. 2. The software development management device 420 may have a similar structure and components that are similar to those described with respect to the performance prediction device 410. As shown, the performance prediction device 410 may include a processor 510, an input/output ("I/O") device 520, a memory 530 containing an operating system ("OS") 540, and a program 550. For example, the performance prediction device 420 may be a single server or may be configured as a distributed computer system including multiple servers or computers that interoperate to perform one or more of the processes and functionalities associated with the disclosed embodiments. In some embodiments, the performance prediction device 420 may further include a display (or a display interface), a peripheral interface, a transceiver, a mobile network interface in communication with the processor 510, a bus configured to facilitate communication between the various components of the performance prediction device 410, and a power source configured to power one or more components of the performance prediction device 410. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The performance prediction device 410 may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be, for example, compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 510 to communicate with other devices via wired or wireless networks, whether local or wide area, private or public, as known in the art. A power source may be configured to provide an appropriate alternating current (AC) or direct current (DC) to power components.

The processor 510 may include one or more of a microprocessor, microcontroller, digital signal processor, co-processor or the like or combinations thereof capable of executing stored instructions and operating upon stored data. Memory 530 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 530.

The processor 510 may be one or more known processing devices, such as a microprocessor from the Pentium™ family manufactured by Intel™ or the Ryzen™ family manufactured by AMD™. The processor 510 may constitute a single core or multiple core processor that executes parallel processes simultaneously. For example, the processor 510 may be a single core processor that is configured with virtual processing technologies. In certain embodiments, the processor 510 may use logical processors to simultaneously execute and control multiple processes. The processor 510 may implement virtual machine technologies, or other similar known technologies to provide the ability to execute, control, run, manipulate, store, etc. multiple software processes, applications, programs, etc. In another embodiment, the processor 510 may include a multiple-core processor arrangement (e.g., dual or quad core) that is configured to provide parallel processing functionalities to allow the performance prediction device 410 to execute multiple processes simultaneously. One of ordinary skill in the art would understand that other types of processor arrangements could be implemented that provide for the capabilities disclosed herein.

The performance prediction device 410 may include one or more storage devices configured to store information used by processor 510 (or other components) to perform certain functions related to the disclosed embodiments. In one example, the performance prediction device 410 may include memory 530 that includes instructions to enable processor 510 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the performance prediction device 410 includes memory 530 that includes instructions that, when executed by processor 510, perform one or more processes consistent with the functionalities disclosed herein. Methods, systems, and articles of manufacture consistent with disclosed embodiments are not limited to separate programs or computers configured to perform dedicated tasks. For example, the performance prediction device 410 may include memory 530 that may include one or more programs 550 to perform one or more functions of the disclosed embodiments. Moreover, processor 510 may execute one or more programs 550 located remotely from the performance prediction device 410. For example, the system 400 may access one or more remote programs 550, that, when executed, perform functions related to disclosed embodiments.

Memory 530 may include one or more memory devices that store data and instructions used to perform one or more features of the disclosed embodiments. Memory 530 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. Memory 530 may include software components that, when executed by processor 510, perform one or more processes consistent with the disclosed embodiments.

The performance prediction device 410 may also be communicatively connected to one or more memory devices (e.g., performance prediction repository 440 (not shown)) locally or through a network (e.g., network 450). The remote memory devices may be configured to store information and may be accessed and/or managed by the performance prediction device 410. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The performance prediction device 410 may also include one or more input/output (I/O) devices 520 that may comprise one or more interfaces for receiving signals or input from devices and providing signals or output to one or more devices that allow data to be received and/or transmitted by the performance prediction device 410. For example, the performance prediction device 410 may include interface components, which may provide interfaces to one or more input devices, such as one or more keyboards, mouse devices, touch screens, track pads, trackballs, scroll wheels, digital cameras, microphones, sensors, and the like, that enable the performance prediction device 410 to receive data from one or more users. In other exemplary embodiments, the I/O devices 520 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In exemplary embodiments of the disclosed technology, the performance prediction device 410 may include any number of hardware and/or software applications that are executed to facilitate any of the operations. In example implementations, one or more I/O interfaces facilitate communication between the performance prediction device 410 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the performance prediction device 410 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the performance prediction device 410 may include a greater or lesser number of components than those illustrated.

EXEMPLARY USE CASE

The following exemplary use case describes just one example of a typical user flow pattern. It is intended solely for explanatory purposes and not in limitation. First, an organization employing one or more teams of software developers may wish to predict future performance of a software development team that is beginning a new software development project. The organization may provide to performance prediction device 410 completed project data associated with each completed software development project. The completed project data may include metrics associated with one or more predictive variables that may be used to define one or more predictive models. For example, completed project data can include team size, and indications of any vacation days associated with a respect team member (or entire team in the case of official work holidays). The completed project data can also include metrics associated with the complexity of the completed software development project. For example, the completed project data can include metrics associated with the total number conditional statements in the code associated with the respective completed project. The metrics can also include whether any new tools, processes, or engineering requirements were a part of the completed project.

The completed project data provided to the performance prediction device (e.g., performance prediction device 410) may allow the system to generate one or more predictive models and further to generate a vector representing the metrics associated with each completed project. The organization can also transmit new software development project data associated with a new software development project. The new software development project data can include metrics associated with the one or more predictive model systems (e.g., the team velocity predictive model system and the team capacity predictive model system). In a similar manner, the system can generate a vector representing the metrics associated with the new software development project. The system can determine one or more completed software development projects that match the new software development project metrics beyond a predetermined threshold, and generate a performance prediction based on the performance results associated with the completed software development project(s) that match the new software development project and provide the performance prediction to the organization.

In another example, an organization employing one or more teams of software developers may wish to predict future performance of a software development team that is beginning a new software development project, as described above. The organization may provide to performance prediction device 410 completed project data associated with each completed software development project. Each completed software development project can be ranked according to the similarity of metrics to the new software development project. The completed software development project having metrics most similar to the metrics of the new software development project can be selected, and the performance metrics of the selected project may be used to predict performance metrics for the new software development project. After the new software development project is completed, the performance prediction can be compared to the actual recorded performance, and the comparison may be used to update one or more predictive model systems to increase the accuracy of the next prediction.

Examples of the present disclosure can be implemented according to at least the following clauses:

Clause 1: A system for providing software development performance predictions, the system comprising: one or more processors; a memory in communication with the one or more processors and storing instructions that, when executed by the one or more processors, are configured to cause the system to: receive project data associated with a plurality of completed projects, each of the plurality of completed projects associated with a respective pre-existing software development team of a plurality of pre-existing software development teams, wherein the project data comprises first metrics associated with one or more predictive variables; receive a first request for a first new software development project, the first request associated with a first software development team of the plurality of pre-existing software development teams; determine one or more second metrics associated with the first new software development project, the one or more second metrics associated with the one or more predictive variables; define one or more predictive model systems based at least in part on the one or more predictive variables; based on the one or more predictive model systems, identify a first portion of completed projects of the plurality of completed projects, the first portion associated with the first software development team, the first portion comprising a first subgroup of the first metrics that match the second metrics beyond a first predetermined threshold; and determine, based on the one or more predictive model systems, a first performance prediction for the first new software development project based on the first subgroup of the first metrics.

Clause 2: The system of clause 1, wherein the one or more predictive model systems comprise a team capacity predictive model and a team velocity predictive model.

Clause 3: The system of clause 2, wherein the team capacity predictive model is based on one or more predictive variables selected from team size, scheduled time off, and work holidays.

Clause 4: The system of clause 2, wherein the team velocity predictive model is based on one or more predictive variables selected from new tools, new processes, new engineering requirements, backlog health, code complexity, and team member expertise.

Clause 5: The system of clause 1, wherein the memory includes further instructions, that when executed by the one or more processors, are further configured to cause the system to: receive a second request for a second new software development project, the second request associated with a second software development team; determine one or more third metrics associated with the second new software development project, the one or more third metrics associated with the one or more predictive variables; determine, based on the one or more predictive model systems, whether a second portion of completed projects that are associated with a second software development team of the plurality of pre-existing software development teams comprises a second subgroup of the first metrics that match the third metrics beyond a second predetermined threshold; responsive to the second subgroup of the first metrics matching the third metrics beyond the second predetermined threshold, determine, based on the one or more predictive model systems, a second performance prediction for the second new software development project based on the second subgroup of the first metrics; and responsive to the second subgroup of the first metrics not matching the third metrics beyond the second predetermined threshold: identify a third portion of completed projects of the plurality of completed projects, the third portion associated with a third software development team of the plurality of pre-existing software development teams, the third portion comprising a third subgroup of the first metrics that match the third metrics beyond a third predetermined threshold; and determine, based on the one or more predictive model systems, a third performance prediction for the second new software development project based on the third subgroup of the first metrics.

Clause 6: The system of claim 1, wherein the memory includes further instructions, that when executed by the one or more processors, are further configured to cause the system to: receive an indication that the first new software development project has been completed; determine a first performance result of the first new software development project; compare the first performance result to the first performance prediction; and update the one or more predictive model systems based at least in part on comparison.

Clause 7: The system of clause 1, wherein the first performance prediction comprises a predicted sprint commitment reliability metric.

Clause 8: The system of clause 1, wherein each of the plurality of completed projects further comprises a completed agile sprint.

Clause 9: A system for providing software development performance predictions, the system comprising: one or more processors; a memory in communication with the one or more processors and storing instructions that, when executed by the one or more processors, are configured to cause the system to: aggregate completed project data of a plurality of completed projects associated with a respective pre-existing software development team of a plurality of pre-existing software development teams, the completed project data comprising first metrics associated with at least one predictive variable comprising team size, scheduled time off, work holidays, new tools, new processes, new engineering requirements, backlog health, code complexity, team member expertise, or combinations thereof; receive a first request for a first new software development project, the first request associated with a first software development team of the plurality of pre-existing software development teams; determine one or more second metrics associated with the first new software development project, the one or more second metrics associated with the at least one predictive variable; define one or more predictive model systems based at least in part on the at least one predictive variable; based on the one or more predictive model systems, identify a first portion of completed projects of the plurality of completed projects, the first portion associated with the first software development team, the first portion comprising a first subgroup of the first metrics that match the second metrics beyond a first predetermined threshold; determine, based on the one or more predictive model systems, a first performance prediction for the first new software development project based on the first subgroup of the first metrics; determine a first performance result of the first new software development project; compare the first performance result to the first performance prediction; and update the one or more predictive model systems based at least in part on comparison.

Clause 10: The system of clause 9, wherein the one or more predictive model systems comprise a team capacity predictive model and a team velocity predictive model.

Clause 11: The system of clause 10, wherein the team capacity predictive model is based on one or more predictive variables selected from team size, scheduled time off, and work holidays.

Clause 12: The system of clause 10, wherein the team velocity predictive model is based on one or more predictive variables selected from new tools, new processes, new engineering requirements, backlog health, code complexity, and a team member expertise.

Clause 13: The system of clause 9, wherein the memory includes further instructions, that when executed by the one or more processors, are further configured to cause the system to: receive a second request for a second new software development project, the second request associated with a second software development team; determine one or more third metrics associated with the second new software development project, the one or more third metrics associated with the at least one predictive variable; determine, based on the one or more predictive model systems, whether a second portion of completed projects that are associated with a second software development team of the plurality of pre-existing software development teams comprises a second subgroup of the first metrics that match the third metrics beyond a second predetermined threshold; responsive to the second subgroup of the first metrics matching the third metrics beyond the second predetermined threshold, determine, based on the one or more predictive model systems, a second performance prediction for the second new software development project based on the second subgroup of the first metrics; and responsive to the second subgroup of the first metrics not matching the third metrics beyond the second predetermined threshold: identify a third portion of completed projects of the plurality of completed projects, the third portion associated with a third software development team of the plurality of pre-existing software development teams, the third portion comprising a third subgroup of the first metrics that match the third metrics beyond a third predetermined threshold; and determine, based on the one or more predictive model systems, a third performance prediction for the second new software development project based on the third subgroup of the first metrics.

Clause 14: The system of clause 9, wherein the first performance prediction comprises a predicted sprint commitment reliability metric.

Clause 15: The system of clause 9, wherein each of the plurality of completed projects further comprises a completed agile sprint.

Clause 16: A method for providing software development performance predictions, the method comprising: receiving project data associated with a plurality of completed projects, each of the plurality of completed projects associated with a respective pre-existing software development team of a plurality of pre-existing software development teams, wherein the project data comprises first metrics associated with one or more predictive variables; receiving a first request for a first new software development project, the first request associated with a new software development team; determining one or more second metrics associated with the first new software development project, the one or more second metrics associated with the one or more predictive variables; defining one or more predictive model systems based at least in part on the one or more predictive variables; based on the one or more predictive model systems, identify a first software development team of the plurality of pre-existing software development teams comprising a first subgroup of the first metrics that match the second metrics beyond a first predetermined threshold; and determining, based on the one or more predictive model systems, a first performance prediction for the first new software development project based on the first subgroup of the first metrics.

Clause 17: The method of clause 16, wherein the one or more predictive model systems comprise a team capacity predictive model and a team velocity predictive model.

Clause 18: The method of clause 16, further comprising: receiving an indication that the first new software development project has been completed; determining a first performance result of the first new software development project; comparing the first performance result to the first performance prediction; and updating the one or more predictive model systems based at least in part on comparison.

Clause 19: The method of clause 16, wherein the first performance prediction comprises a predicted sprint commitment reliability metric.

Clause 20: The method of clause 16, wherein each of the plurality of completed projects further comprises a completed agile sprint.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for providing software development performance predictions, the system comprising:
   one or more processors;
   a memory in communication with the one or more processors and storing instructions that, when executed by the one or more processors, are configured to cause the system to:
      receive project data associated with a plurality of completed projects, each of the plurality of completed projects associated with a respective pre-existing software development team of a plurality of pre-existing software development teams, wherein the project data comprises first metrics associated with one or more predictive variables;
      receive a first request for a first new software development project, the first request associated with a first software development team of the plurality of pre-existing software development teams;
      determine one or more second metrics associated with the first new software development project, the one or more second metrics associated with the one or more predictive variables;
      define one or more predictive model systems based at least in part on the one or more predictive variables, the one or more predictive model systems comprising at least a team velocity predictive model, the team velocity predictive model based on:
         (i) code complexity represented by a cyclomatic complexity metric,
         (ii) tool metrics comprising a first weighted sum of each new tool to be implemented multiplied by a first complexity factor,
         (iii) new process metrics comprising a second weighted sum of each new process requirement to be implemented multiplied by a second complexity factor, and
         (iv) new engineering requirement metrics comprising a third weighted sum of each new engineering requirement to be implemented multiplied by a third complexity factor;
      based on the one or more predictive model systems, identify, using a vector similarity calculation, a first portion of completed projects of the plurality of completed projects, the first portion associated with the first software development team, the first portion comprising a first subgroup of the first metrics that match the second metrics beyond a first predetermined threshold; and determine, based on the one or more predictive model systems, a first performance prediction for the first new software development project based on the first subgroup of the first metrics, wherein the first performance prediction comprises a weighted average of the first subgroup of the first metrics based on the vector similarity calculation of the first portion of completed projects to the first new software development project.

2. The system of claim 1, wherein:
the one or more predictive model systems comprise a team capacity predictive model,
the team capacity predictive model is based on one or more predictive variables selected from team size, scheduled time off, and work holidays, and team member expertise, and
team member expertise is reported as a value on a predefined scale, wherein a lower value is indicative of less experience and a higher value is indicative of more experience.

3. The system of claim 1, wherein the vector similarity calculation further comprises using the one or more predictive model systems to:
generate a vectorized representation for each completed project of the plurality of completed projects;
generate a vectorized representation of the first new software development project;
perform a cosine similarity calculation between each completed project and the first new software development project; and
select one or more completed projects of the plurality of completed projects based on the cosine similarity calculation.

4. The system of claim 1, wherein:
the team velocity predictive model is further based on predictive variables comprising backlog health, and
the cyclomatic complexity metric is based at least in part on a number of conditional operators in the code and a number of lines of code.

5. The system of claim 1, wherein the memory includes further instructions, that when executed by the one or more processors, are further configured to cause the system to:
receive a second request for a second new software development project, the second request associated with a second software development team;
determine one or more third metrics associated with the second new software development project, the one or more third metrics associated with the one or more predictive variables;
determine, based on the one or more predictive model systems, whether a second portion of completed projects that are associated with a second software development team of the plurality of pre-existing software development teams comprises a second subgroup of the first metrics that match the third metrics beyond a second predetermined threshold;
responsive to the second subgroup of the first metrics matching the third metrics beyond the second predetermined threshold, determine, based on the one or more predictive model systems, a second performance prediction for the second new software development project based on the second subgroup of the first metrics; and
responsive to the second subgroup of the first metrics not matching the third metrics beyond the second predetermined threshold:

identify a third portion of completed projects of the plurality of completed projects, the third portion associated with a third software development team of the plurality of pre-existing software development teams, the third portion comprising a third subgroup of the first metrics that match the third metrics beyond a third predetermined threshold; and
determine, based on the one or more predictive model systems, a third performance prediction for the second new software development project based on the third subgroup of the first metrics.

6. The system of claim 1, wherein the memory includes further instructions, that when executed by the one or more processors, are further configured to cause the system to:
receive an indication that the first new software development project has been completed;
determine a first performance result of the first new software development project;
compare the first performance result to the first performance prediction; and
update the one or more predictive model systems based at least in part on comparison.

7. The system of claim 1, wherein:
the first performance prediction comprises a predicted sprint commitment reliability metric, and
each of the plurality of completed projects further comprises a completed agile sprint.

8. The system of claim 1, wherein:
the one or more predictive model systems comprise a team capacity predictive model,
the team capacity predictive model is based on at least team member expertise, and
team member expertise is reported as a value on a predefined scale, wherein a lower value is indicative of less experience and a higher value is indicative of more experience.

9. A system for providing software development performance predictions, the system comprising:
one or more processors;
a memory in communication with the one or more processors and storing instructions that, when executed by the one or more processors, are configured to cause the system to:
aggregate completed project data of a plurality of completed projects associated with a respective pre-existing software development team of a plurality of pre-existing software development teams, the completed project data comprising first metrics associated with at least one predictive variable comprising team size, scheduled time off, work holidays, new tools, new processes, new engineering requirements, backlog health, code complexity, number of lines of code, or combinations thereof;
receive a first request for a first new software development project, the first request associated with a first software development team of the plurality of pre-existing software development teams;
determine one or more second metrics associated with the first new software development project, the one or more second metrics associated with the at least one predictive variable;
define one or more predictive model systems based at least in part on the at least one predictive variable, the one or more predictive model systems comprising at least a team velocity predictive model, the team velocity predictive model based on:

(i) tool metrics comprising a first weighted sum of each new tool to be implemented multiplied by a first complexity factor, (ii) new process metrics comprising a second weighted sum of each new process requirement to be implemented multiplied by a second complexity factor, and (iii) new engineering requirement metrics comprising a third weighted sum of each new engineering requirement to be implemented multiplied by a third complexity factor;

based on the one or more predictive model systems, identify a first portion of completed projects of the plurality of completed projects, the first portion associated with the first software development team, the first portion comprising a first subgroup of the first metrics that match the second metrics beyond a first predetermined threshold;

determine, based on the one or more predictive model systems, a first performance prediction for the first new software development project based on the first subgroup of the first metrics, wherein the first performance prediction comprises a weighted average of the first subgroup of the first metrics based on a similarity of the first portion of completed projects to the first new software development project;

determine a first performance result of the first new software development project;

compare the first performance result to the first performance prediction; and update the one or more predictive model systems based at least in part on comparison.

10. The system of claim 9, wherein the one or more predictive model systems comprise a team capacity predictive model.

11. The system of claim 10, wherein the team capacity predictive model is based on one or more predictive variables selected from team size, scheduled time off, and work holidays.

12. The system of claim 9, wherein:
the team velocity predictive model is further based on predictive variables comprising code complexity and backlog health,
the code complexity based at least in part on a number of conditional operators in the code and a number of lines of code, and
the code complexity is represented by a cyclomatic complexity metric.

13. The system of claim 9, wherein the memory includes further instructions, that when executed by the one or more processors, are further configured to cause the system to:
receive a second request for a second new software development project, the second request associated with a second software development team;
determine one or more third metrics associated with the second new software development project, the one or more third metrics associated with the at least one predictive variable;
determine, based on the one or more predictive model systems, whether a second portion of completed projects that are associated with a second software development team of the plurality of pre-existing software development teams comprises a second subgroup of the first metrics that match the third metrics beyond a second predetermined threshold;
responsive to the second subgroup of the first metrics matching the third metrics beyond the second predetermined threshold, determine, based on the one or more predictive model systems, a second performance prediction for the second new software development project based on the second subgroup of the first metrics; and
responsive to the second subgroup of the first metrics not matching the third metrics beyond the second predetermined threshold:
identify a third portion of completed projects of the plurality of completed projects, the third portion associated with a third software development team of the plurality of pre-existing software development teams, the third portion comprising a third subgroup of the first metrics that match the third metrics beyond a third predetermined threshold; and
determine, based on the one or more predictive model systems, a third performance prediction for the second new software development project based on the third subgroup of the first metrics.

14. The system of claim 9, wherein the first performance prediction comprises a predicted sprint commitment reliability metric.

15. The system of claim 9, wherein each of the plurality of completed projects further comprises a completed agile sprint.

16. A method for providing software development performance predictions, the method comprising:
receiving project data associated with a plurality of completed projects, each of the plurality of completed projects associated with a respective pre-existing software development team of a plurality of pre-existing software development teams, wherein the project data comprises first metrics associated with one or more predictive variables;
receiving a first request for a first new software development project, the first request associated with a new software development team;
determining one or more second metrics associated with the first new software development project, the one or more second metrics associated with the one or more predictive variables;
defining one or more predictive model systems based at least in part on the one or more predictive variables, wherein at least one of the one or more predictive variables comprises:
(i) tool metrics comprising a first weighted sum of each new tool to be implemented multiplied by a first complexity factor,
(ii) new process metrics comprising a second weighted sum of each new process requirement to be implemented multiplied by a second complexity factor, and
(iii) new engineering requirement metrics comprising a third weighted sum of each new engineering requirement to be implemented multiplied by a third complexity factor;
based on the one or more predictive model systems, identify, using a vector similarity calculation, a first software development team of the plurality of pre-existing software development teams comprising a first subgroup of the first metrics that match the second metrics beyond a first predetermined threshold; and
determining, based on the one or more predictive model systems, a first performance prediction for the first new software development project based on the identified first subgroup of the first metrics.

17. The method of claim 16, wherein the one or more predictive model systems comprise a team capacity predictive model and a team velocity predictive model.

18. The method of claim 16, further comprising:
- receiving an indication that the first new software development project has been completed;
- determining a first performance result of the first new software development project;
- comparing the first performance result to the first performance prediction; and
- updating the one or more predictive model systems based at least in part on comparison.

19. The method of claim 16, wherein the first performance prediction comprises a predicted sprint commitment reliability metric.

20. The method of claim 16, wherein each of the plurality of completed projects further comprises a completed agile sprint.

* * * * *